Jan. 19, 1960 J. C. PAROT 2,921,501

AIRCRAFT LOAD-RELEASE DEVICE

Filed June 7, 1956 15 Sheets-Sheet 1

Inventor
J. C. Parot
By Glascock Downing & Seebold
Attys

Jan. 19, 1960 J. C. PAROT 2,921,501

AIRCRAFT LOAD-RELEASE DEVICE

Filed June 7, 1956 15 Sheets-Sheet 2

Inventor
J. C. Parot
By Glascock Downing & Seebold
Attys.

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 4

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 5

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 6

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 7

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 8

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 9

Inventor
J. C. Parot
By Glascock Downing Seebold
Attys.

Jan. 19, 1960 J. C. PAROT 2,921,501

AIRCRAFT LOAD-RELEASE DEVICE

Filed June 7, 1956 15 Sheets-Sheet 10

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 11

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 12

Inventor
J. C. Parot
By Glascock Downing Seebold
Attys.

Jan. 19, 1960 J. C. PAROT 2,921,501

AIRCRAFT LOAD-RELEASE DEVICE

Filed June 7, 1956 15 Sheets-Sheet 13

Inventor
J. C. Parot
By Glascock Downing & Seebold
Attys.

Jan. 19, 1960 J. C. PAROT 2,921,501

AIRCRAFT LOAD-RELEASE DEVICE

Filed June 7, 1956 15 Sheets-Sheet 14

Inventor
J. C. Parot
By Glascock Downing Seebold
Attys.

Jan. 19, 1960 J. C. PAROT 2,921,501

AIRCRAFT LOAD-RELEASE DEVICE

Filed June 7, 1956 15 Sheets-Sheet 15

Inventor
J. C. Parot
By Glascock Downing & Seebold
Attys.

2,921,501

AIRCRAFT LOAD-RELEASE DEVICE

Jean Charles Parot, Paris, France, assignor to Societe Nationale de Constructions Aeronautiques du Sud-Ouest, Paris, France, a French company Application June 7, 1956, Serial No. 589,931

Claims priority, application France June 13, 1955

2 Claims. (Cl. 89—1.5)

The projectiles (bombs, self-propelled engines, rockets, etc.) or similar loads carried by an airplane, or any other aircraft, are often disposed outside the same to increase the dropping accuracy. This arrangement, however, offers the drawback of considerably increasing the drag of the aerodyne. It has been proposed heretofore to transport loads such as projectiles in appropriate stowage-rooms and to jettison them through a patch in the bottom wall of such rooms by opening a drop-gate. This method, however, cannot be used for releasing self-propelled engines while, in the case of bombs, the accuracy of the dropping is considerably impaired.

The invention has for its purpose to provide a device which suppresses these drawbacks since it permits transporting the loads to be jettisoned in stowage-rooms of which the outer wall offers a continuous stream-lined profile, said device bringing, when required, the loads into jettisoning position whereupon it substantially re-establishes the initial continuity of the said profile.

It is, therefore, an object of the invention to transport a load to be jettisoned in a stowage-room having a hatch normally obturated by a drop-gate, comprising one or more panels, the said load being releasably secured inside the stowage-room on a load-carrying structure, hereafter called the "support," adapted to be brought out through the hatch after opening of the drop-gate, whereupon the hatch is obturated anew by a member integral with the said support. If required, this obturation may be completed by a partial re-closing of the drop-gate.

Preferably, the complete re-closing of the drop-gate is automatically triggered as the support reaches the end of its retracting stroke.

As described hereunder, a coordination between the various controls may be ensured by electric and/or mechanical means.

In the device according to the invention, in view of preserving the general stream-line profile of the airplane, the drop-gate preferably opens inside the stowage-room.

A more particular object of the invention is to control the displacements of the above mentioned support by means of a hydraulic jack, while the load is preferably set into jettisoning position by means of a control automatically triggered as the drop-gate reaches the end of its opening stroke.

In an embodiment of the invention, the stroke of the abovementioned hydraulic jack is approximately equal to the useful height of the stowage-room, while, the support offers the shape of a plate having a profile adapted to that of the hatch. Thus, at the end of the outwards or lowering stroke of the support, the said plate practically obturates the hatch.

In another embodiment of the invention, the overall stroke of the jack is greater than the useful height of the stowage-room and the adjacent edges of the drop-gate panels are provided with registering notches to accommodate the linkages interconnecting the jack with the support. In these conditions, the support may be brought completely outside the hatch and the drop-gate may be re-closed behind the said support. It is thus possible, when self-propelled engines are to be released, to transport said engines inside the aerodyne and to bring them, shortly before dropping, outside the aerodyne at a sufficient distance from the re-closed drop-gate, so that the starting of the engine does not risk to damage the aerodyne.

In the last case, two additional coordinating or interlocking systems may be provided, viz. one for subordinating the re-closing of the drop-gate to the complete lowering of the support and another one for subordinating the retraction of the support to the complete re-opening of the drop-gate.

Advantageously, to obtain a high degree of safety in the controls and a comparatively compact assembly, the mechanisms controlling the jack and those which actuate the drop-gate are of the nut-and-screw type; they are preferably driven by electric motors, preferably equipped with suitable brakes. With these arrangements, the said mechanisms are positively controlled in their both directions of actuation and the reversal of the resultant motion is obtained by inverting their way of rotation.

In order to reduce the frictions, at least the nut-and-screw mechanism of the jack is constituted by a so-called "integral screw" associated with a specially designed nut provided with rolling bodies cooperating with the grooves between the threads of the screw. Two separate reversible electric motors may be used for controlling the drop-gate and the jack respectively, said motors being preferably electrically interconnected through reversing switches actuated by end-of-stroke abutments provided on the jack and the gate.

This electric interconnection is advantageously so designed that at the end of the lowering stroke of the support suitable electric circuits are prepared for the retracting stroke and vice versa.

Alternatively, in both above described embodiments of the device, the control of the jack and that of the drop-gate may be ensured by one single motor provided with a reversing device associated with the planet-wheel carrier of a differential gear, of which one sun-wheel drives the screw jack, while the other sun-wheel actuates the drop-gate. In these conditions, if said sun-wheels are selectively held stationary, the same motor successively controls first the jack and then the drop-gate.

For example, in the first embodiment described, the same motor can, without reversal of its rotation during the whole lowering operation, first open the drop-gate and then bring the support out. The way of rotation of the motor is only reversed between the lowering and retracting operations while, during the whole retracting operation, the said motor can, without any other reversal of its rotation, first withdraw the support and then re-close the drop-gate. In the second embodiment described, however, a further reversal of the way of rotation of the motor is required during the lowering operation and another one during the retraction, so as to obtain at the end of the lowering stroke a re-closing of the drop-gate and, before the retraction of the support, a re-opening of the drop-gate. These additional reversals of the way of rotation of the motor may be obtained by means of end-of-stroke abutments.

In all cases, suitable braking devices are preferably provided to avoid any unwanted operation of the mechanism under the action of extraneous forces.

In an advantageous constructive embodiment of the invention comprising a differential gear, the control of the jack and that of the drop-gate are rotatable and coaxial and the rotating shaft controlling the gate is threaded and carries a non-rotatable nut, so that the displacement of the said nut along the said shaft, gives an indication of the position of the drop-gate panels. With this arrangement, the abutments provided to control the reversing contacts, for the jack as well as for the drop-gate may be disposed along the said co-axial shafts, which greatly simplifies the design of the coordinating or interlocking systems.

Moreover, in the differential gear, each sun-wheel is preferably associated with an automatic clutching-declutching device of the type wherein a helical toothed-wheel rotates with the said sun-wheel in permanent gearing relationship with a reversible tangential worm-screw keyed on a shaft rotatively and slidably mounted on a fixed casing between a low friction abutment and a clutching high-friction abutment.

Thus, when the planet-wheel carrier is rotated, since both sun-wheels tend to be driven the same way, one of them brings the shaft of its tangential screw on its high-friction abutment, while the other one brings the shaft of its tangential screw towards its low-friction abutment. In consequence, the first sun-wheel is stopped while the second one remains free of rotating. This arrangement offers several advantages. First of all, any jamming of the differential gear is avoided. Moreover, only the required sun-wheel is rotated during the initial period of the actuation; finally, the high-friction abutments oppose any counter-rotation of the sun-wheels.

Preferred embodiments of the invention will be hereinafter described with reference to the accompanying drawings, given merely by way of example and in which.

Figure 6:
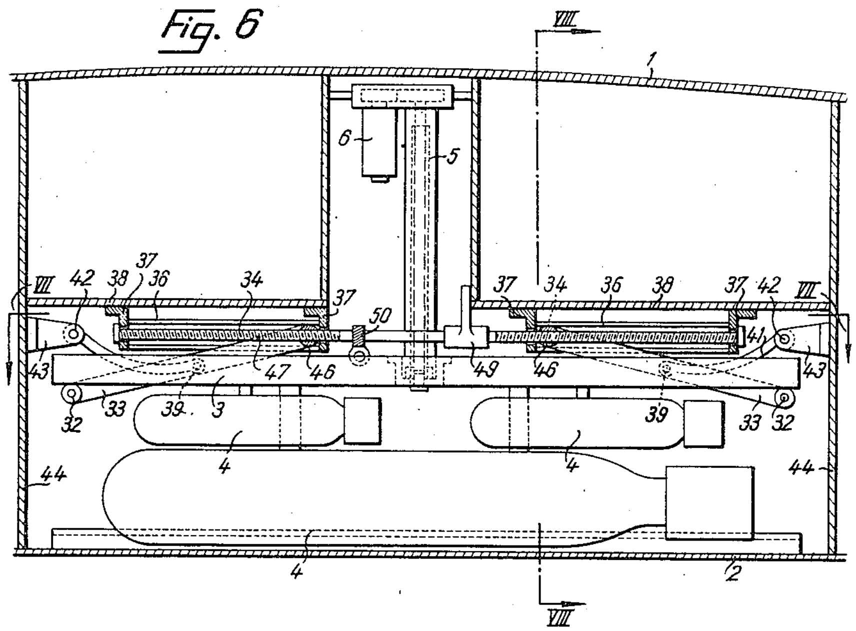
Figure 6 is a vertical section, along the longitudinal axis of an airplane, of a device for guiding the vertical motion of a bomb-carrying plate.
Figure 7:
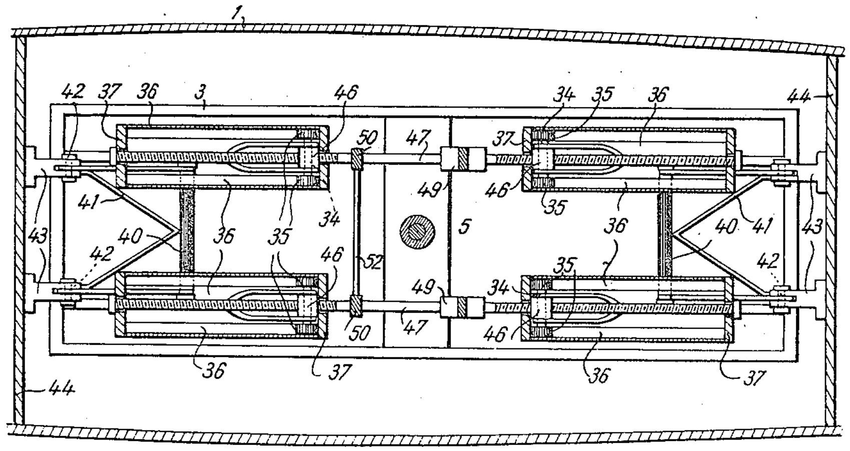
Figure 7 is a sectional view, along line VII—VII of Figure 6.
Figures 8, 9:
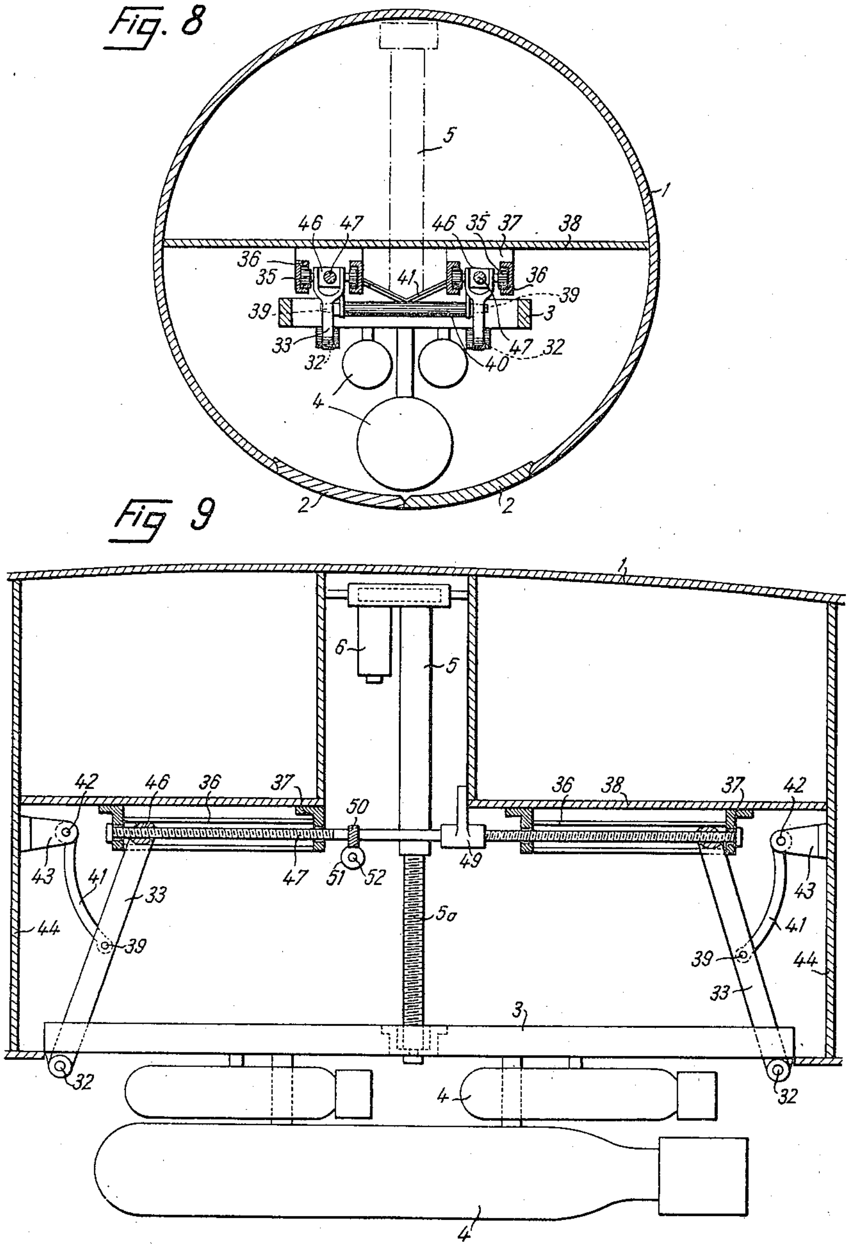
Figure 8 is a sectional view along line VIII—VIII of Figure 6.

Figure 9, similar to Figure 6, shows the plate in its lowermost position.

Figure 10:
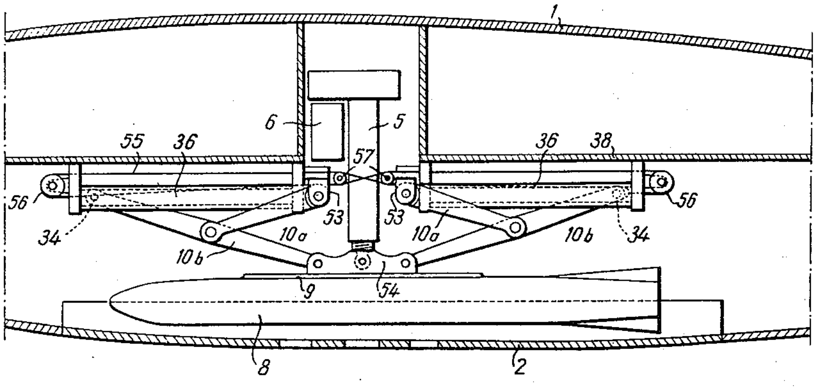
Figure 11:
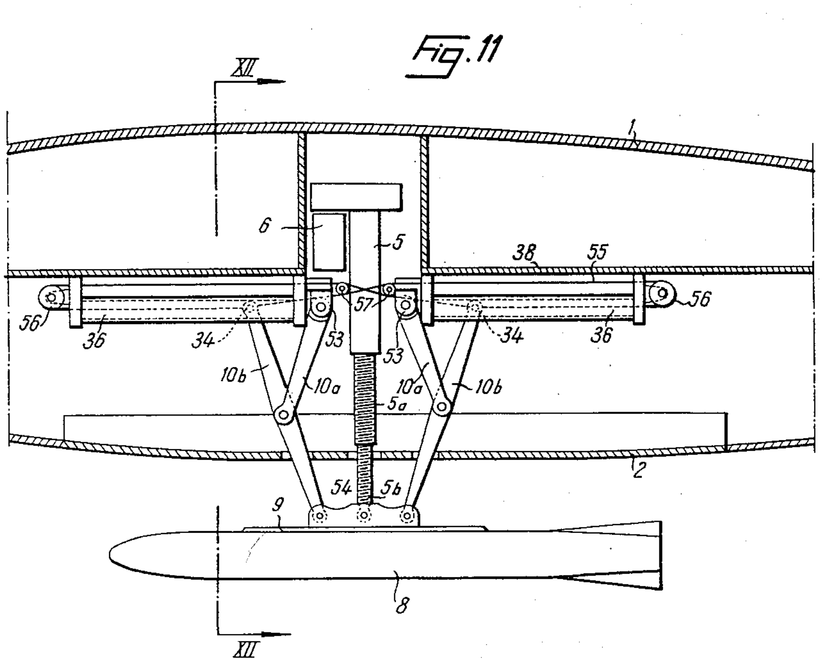

Figures 10 and 11, respectively, similar to Figures 6 and 9, show a device for guiding the vertical motion of an engine-carrying structure.

Figure 12:
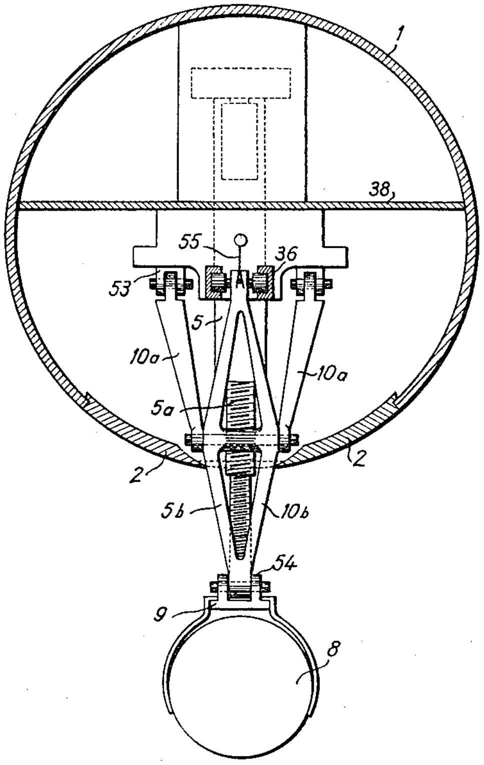

Figure 12 is a sectional view along line XII—XII of Figure 11.

Figure 13:
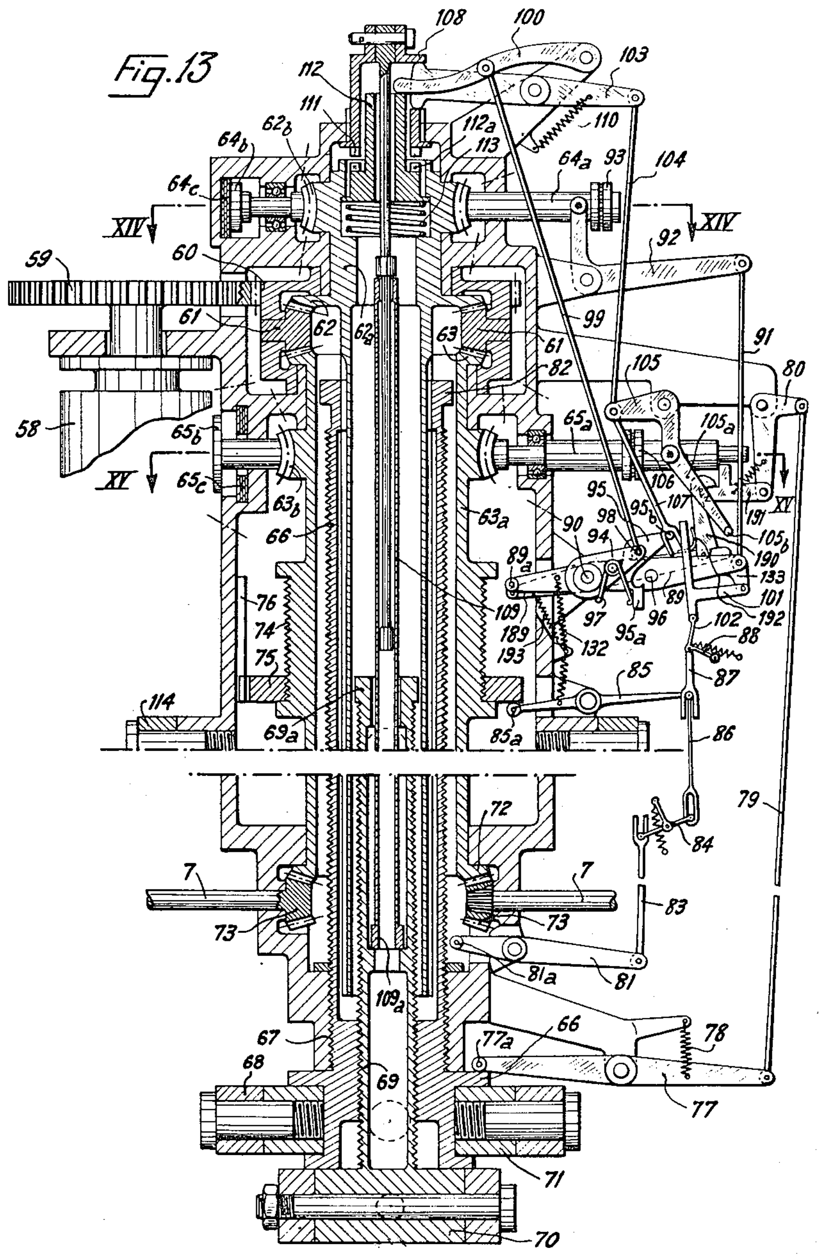

Figure 13 is a vertical sectional view of a differential gear mechanism for controlling from one single motor the drop-gate and the jack actuating the load-carrying support.

Figure 13A:
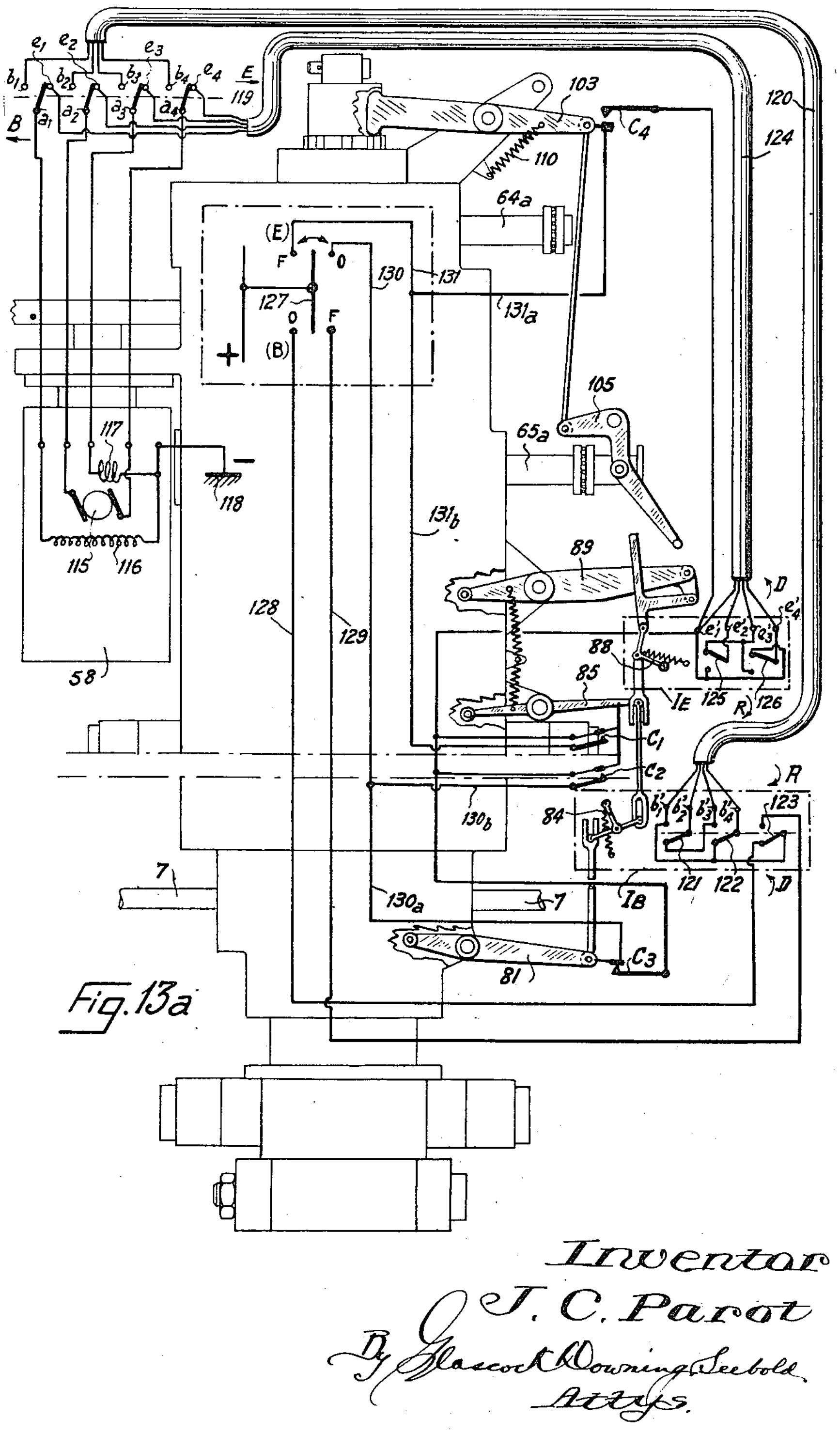

Figure 13*a* is a wiring diagram for the motor shown in Figure 13.

Figure 14:
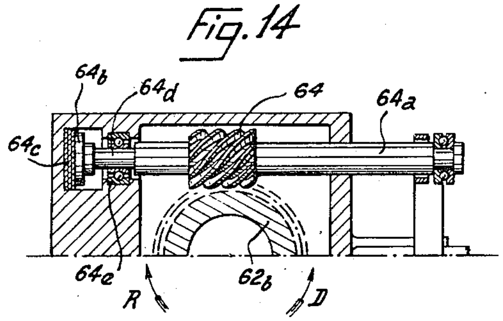

Figure 14 is a sectional view along line XIV—XIV of Figure 13.

Figure 15:
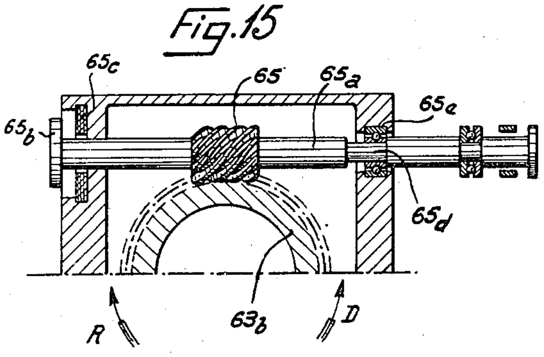

Figure 15 is a sectional view along line XV—XV of Figure 13.

Figure 16:
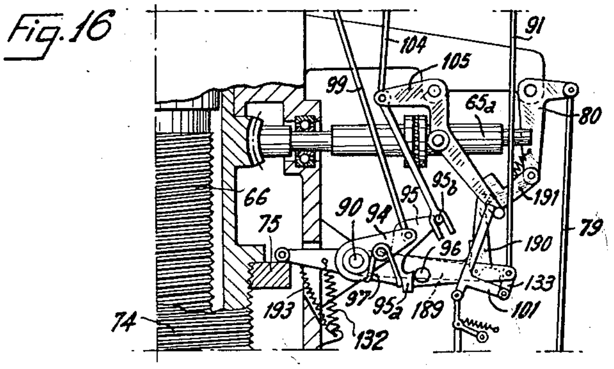
Figure 17:
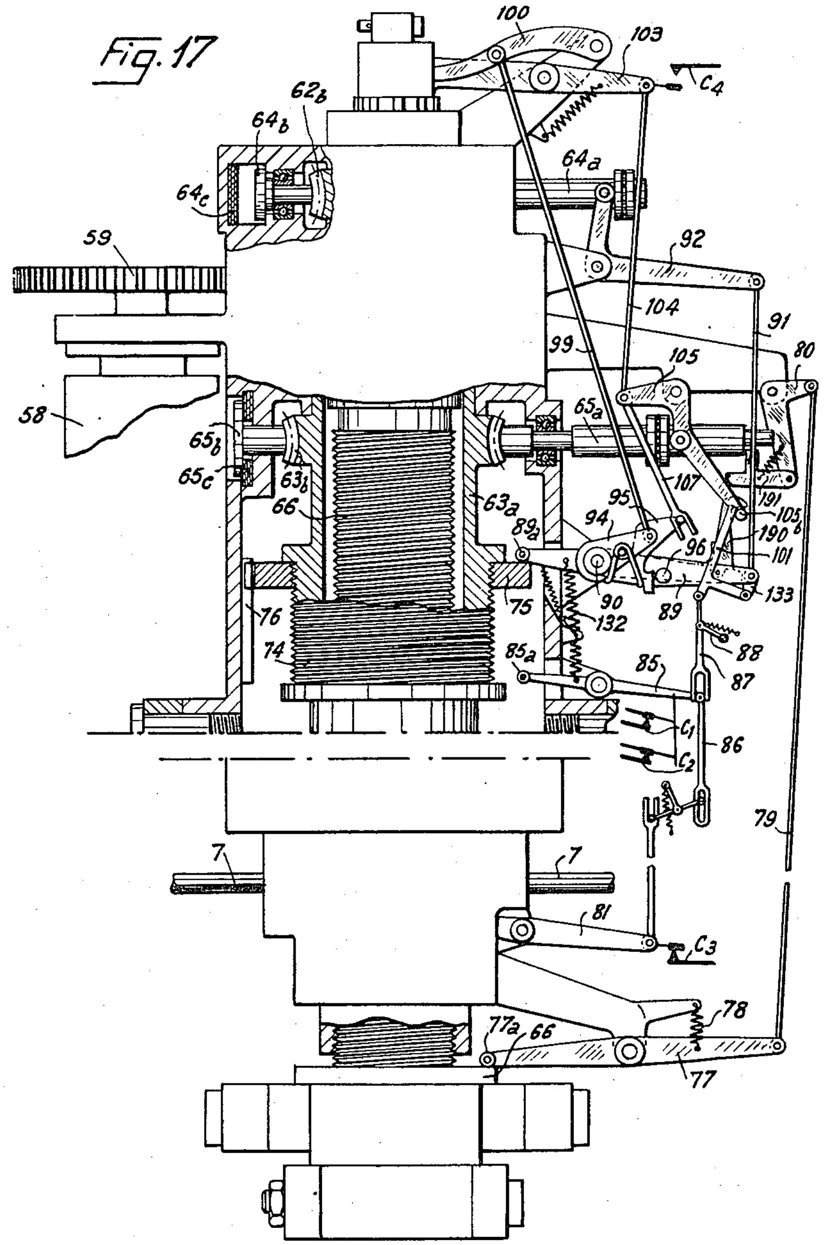
Figure 18:
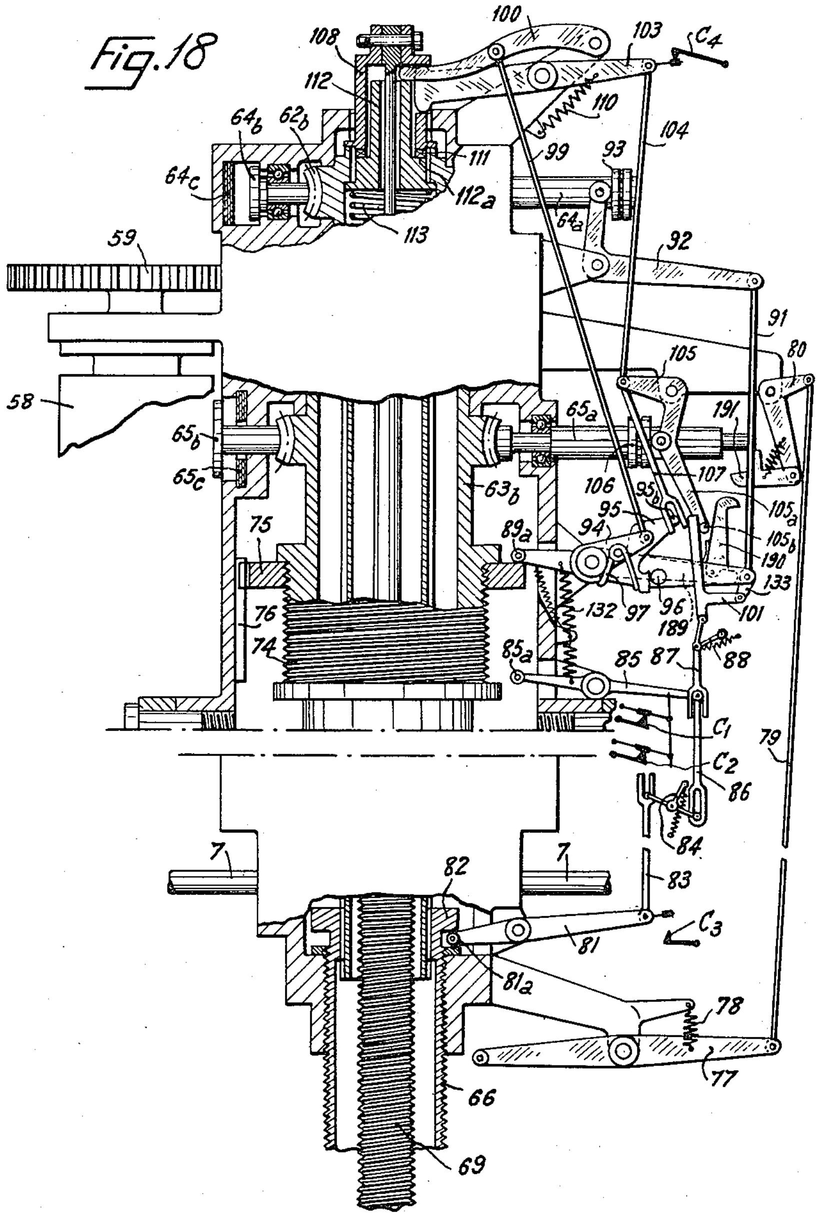
Figure 19:
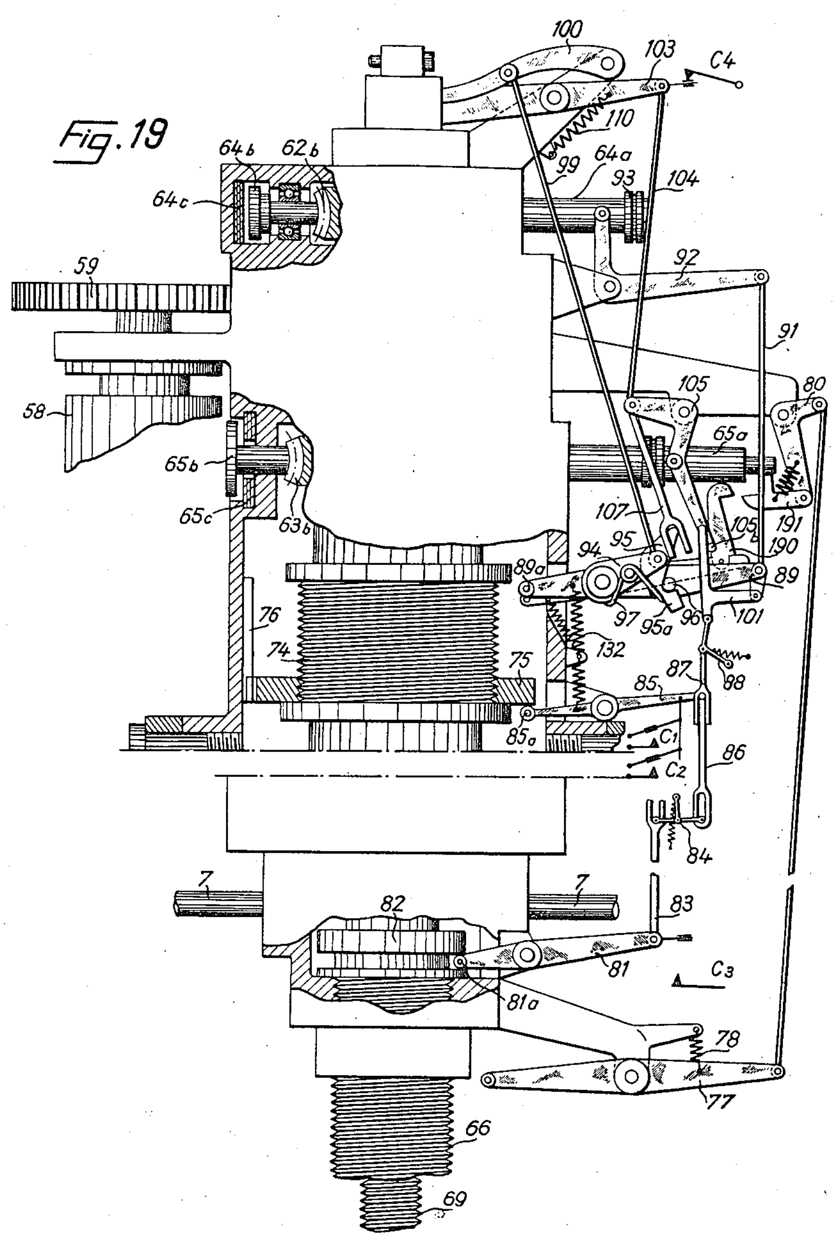
Figure 20:
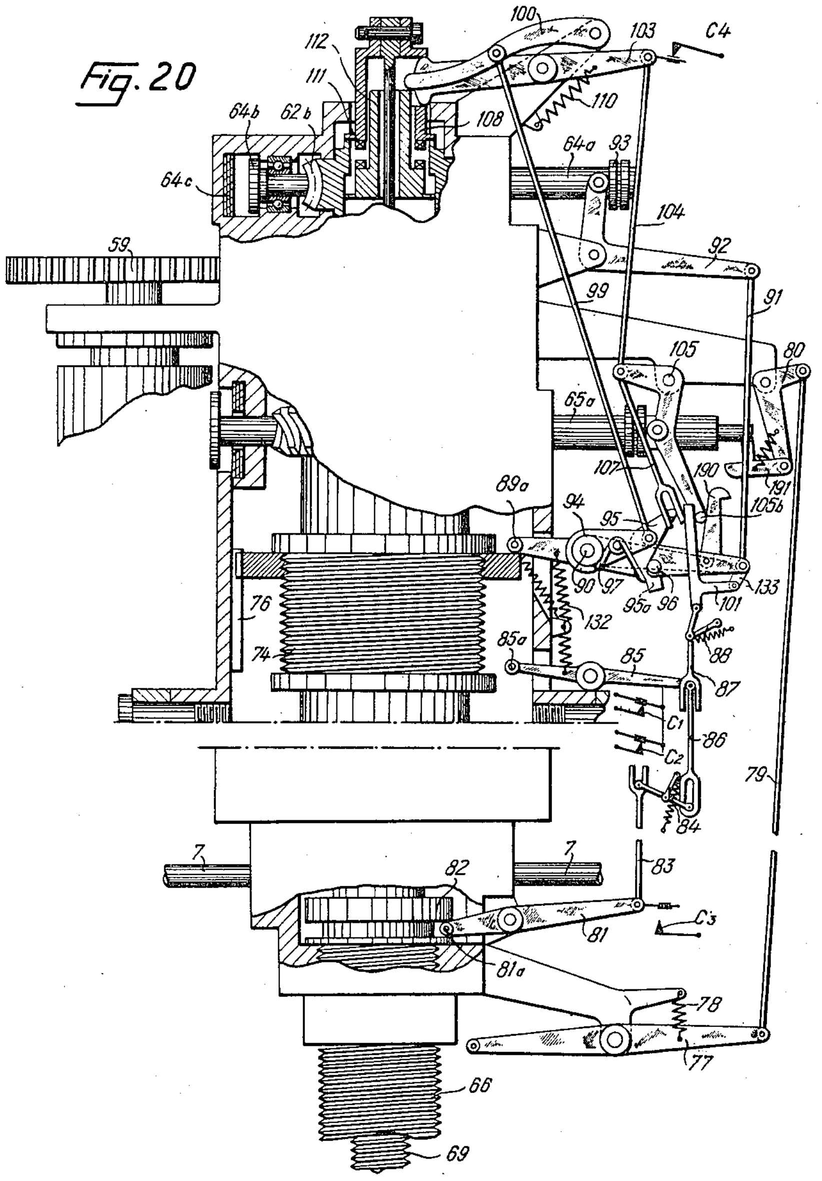

Figure 16 is a view of a detail of Figure 13 during the first step of the operation.

Figures 17, 18, 19, 20 and 21 show the device of Figure 13 during the following steps of its operation.

Figures 22, 23:
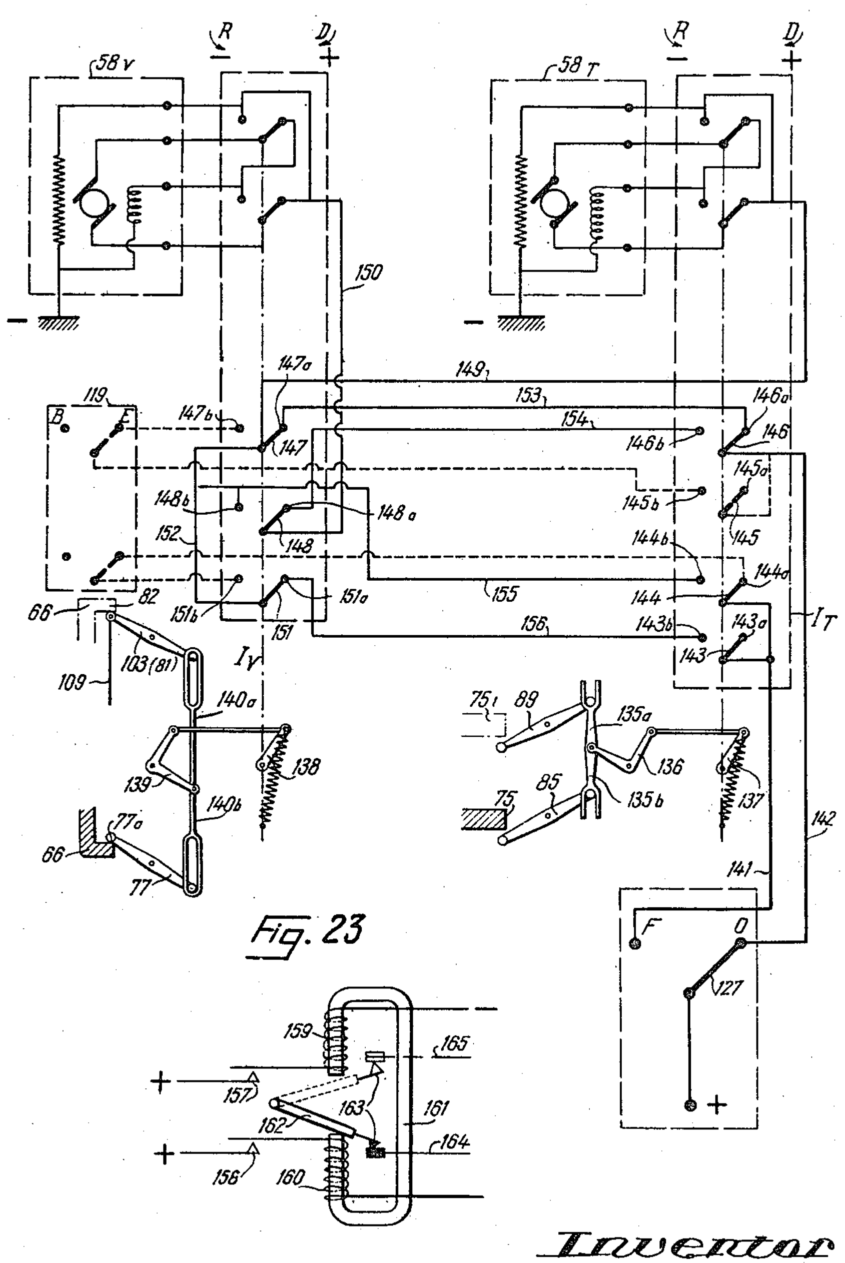

Figure 22 is an alternative wiring diagram of the device shown in Figures 13 to 16, and Figure 23 shows an alternative embodiment of a detail of Figure 22.

Figures 1, 2, 3:
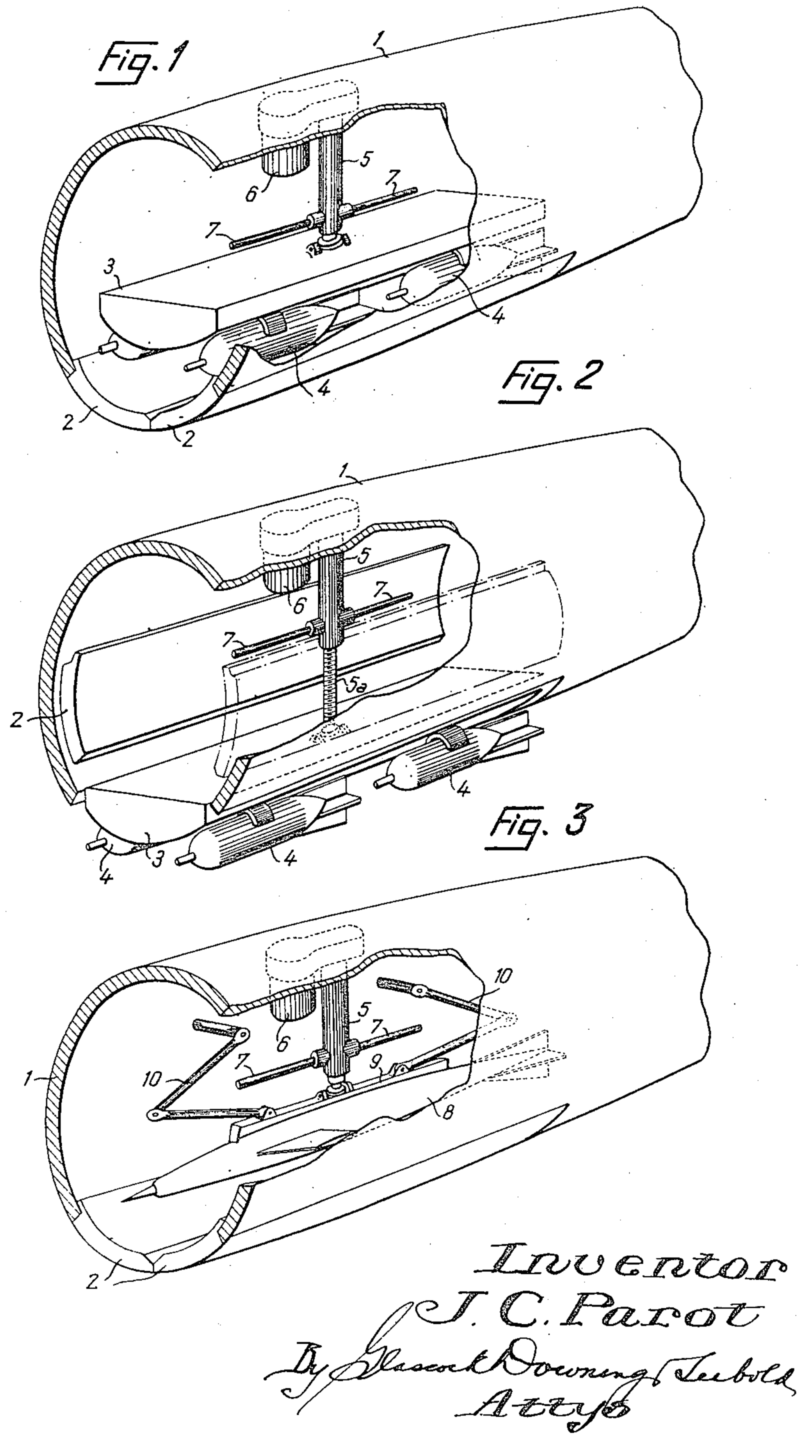
Figures 1 and 2 are diagrammatic perspective views of a device according to the invention to be used for dropping bombs.
Figures 3 and 4 show an alternative embodiment to be used for releasing a self-propelled engine.
Figure 5:
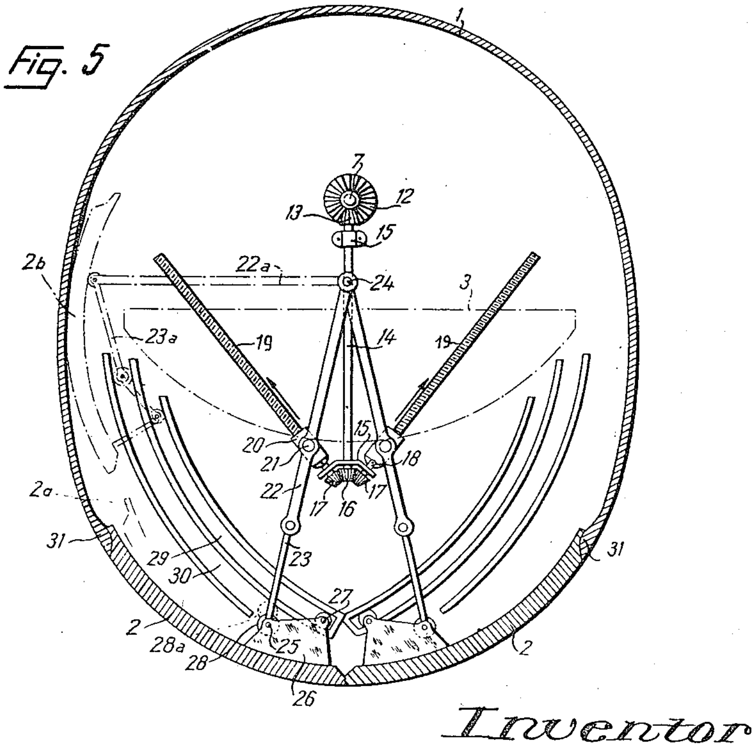
Figure 5 is a cross-sectional view of a stowage-room showing the device for controlling opening and closing of the drop-gate.

In Figures 1 and 2, of which the only purpose is to illustrate the principle of the invention, and in which no detail of the mechanisms has been shown, the fuselage 1 of an airplane includes a stowage-room normally obturated by a drop-gate constituted, in the example shown, by two sliding panels 2. Inside the stowage-room is disposed a plate 3 under which are suspended bombs 4. This plate may be displaced vertically by means of a screw-jack 5 which, in a first embodiment of the invention, is driven, through a differential gear, from a motor 6. In this case, as explained hereunder, this same differential gear also permits driving shafts 7 controlling the panels 2, as described hereunder and as shown in Figure 5.

In Figure 1, the panels 2 are closed and the bombs 4 are located within the stowage-room.

When the bombs are to be dropped, the panels 2 are first open and preferably, as shown in Figure 2, withdrawn inside the stowage-room.

The plate 3 is lowered and obturates the hatch. The bombs 4 are thus brought outside the stowage-room and may be jettisoned from the plate 3 by any known means. From the position of Figure 1 to that of Figure 2, two steps of operation comprising the opening of the panels 2 and the lowering of the plate 3 must be effected in this order. Conversely, to return from the position of Figure 2 to that of Figure 1, it is necessary to retract the plate 3 and then to re-close the panels 2.

In the case (Figure 3) when the projectile to be jettisoned is a special engine 8, the same is preferably supported by a beam 9 held longitudinally aligned with the fuselage 1 by means of articulated linkages 10. In this case, the jack 5 is provided with a telescopic screw. In the releasing position (Figure 4), both members **5*a* and 5*b* of the said screw are extended, which brings the engine 8 to a certain distance from the fuselage 1. This permits re-closing the panels 2*b* behind the engine. For this purpose, the said panels are provided, in their adjacent edges, with registering notches 11 to accommodate the lower members of the articulated linkages 10 and the lower member 5*b*** of the telescopic screw.

In this example, the notches 11 constitute, in the configuration "engine inside-drop-gate closed," small solutions of continuity of the profile. However, it will be easily understood that, if desired, a perfectly continuous profile may be obtained in the configuration "engine-inside-drop-gate closed" as well as in the configuration "engine outside-drop-gate closed" by suitably shaping the panels which, for example, may be partially overlapping in the first one of said configurations.

Figure 4:
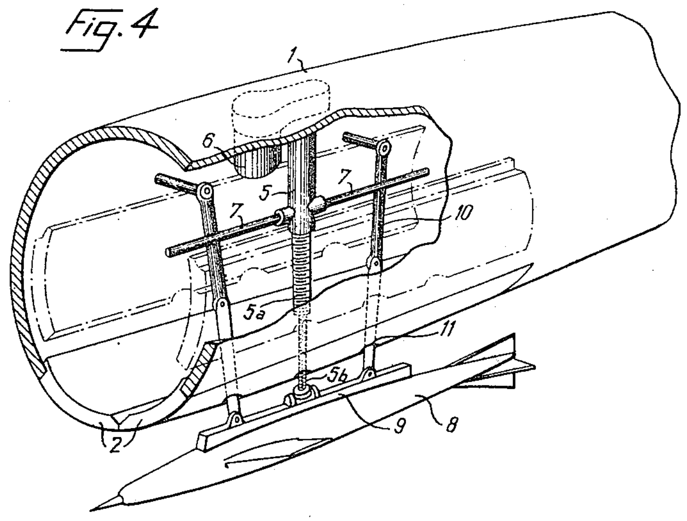

The passage from the configuration shown in Figure 3 to that of Figure 4 thus implies successively and, in this order, (1) Opening of the drop-gate,
(2) Lowering of the engine,
(3) Re-closing of the drop-gate.

Conversely, the return from the configuration shown in Figure 4 to that of Figure 3 requires:

(1) Re-opening of the drop gate,
(2) Retraction of the beam 9 previously carrying the engine,
(3) Re-closing of the drop gate.

It is to be noted that, in the two cases, respectively shown in Figures 1 and 2, on one side, and 3 and 4, on the other side, the device according to the invention offers the additional advantage of facilitating the operations of loading.

As a matter of fact, with such a device, it suffices, when the stowage-room is to be loaded, to bring the support into outside position, to releasably secure the load thereunder, to retract the said support, and to re-close the drop-gate.

These various operations, both in the case of bombs and in the case of a special engine, are obtained by means of mechanisms which will be described hereunder with reference to Figures 13, etc.

However, the devices provided to control opening and closing of the drop-gate, on the one hand, and those provided for guiding the vertical displacements of the plate 3 or the beam 9 by means of one single jack acting substantially at their centre of gravity will be first described.

In Figure 5, the shaft 7 is rotated from the motor 6, as more precisely exposed here under. Near the ends of the stowage-room, bevel gears 12—13 are provided to transmit the rotation of the shaft 7 to vertical shafts 14 journalled in bearings 15. At this lower end, each one of said shafts 14 carries a bevel pinion 16 gearing with two other bevel pinions 17 also journaled in bearings 15. The axle of each pinion 17 is connected, through a ball-and-socket joint 18, to a threaded rod 19. Each threaded rod 19 meshes with a nut 20 pivoted around an axle 21 carried by one arm 22 of an articulated linkage comprising two arms 22 and 23. The upper end of each arm 22 is pivoted around an axle 24. The lower end of each arm 23 is hinged, through a pivot 25, on a shoe 26 rigid with one of the hatch panels 2. Each shoe 26 carries two rollers 27 and 28. The roller 27 is rollingly guided between the curved arms of a U-shaped guide 29. The roller 28, in the position shown in full line in Figure 5 is released from a guide 30 similar to the guide 29 and concentric thereto.

This device operates as follows:

In the position shown in full line in Figure 5, the panels 2 are closed; the adjacent edges of said panels bear against each other, while their outer edges rest on longitudinal bearing ribs 31 provided along the edges of the opening of the hatch. The two arms 22 and 23 of each linkage are substantially aligned, thus acting as a knee-piece to safely hold the panels closed. When the shaft 7 is rotated the suitable way, the nuts 20 are displaced in the direction of the arrows along the threaded rods 19.

This displacement causes a break of the knee-joint between the arms 22 and 23 and since the rollers 27 are abutted against the lower end of the guide 29, the rollers 28 are brought into the position **28*a* in contact with the upper rail of the guide 30. The external edge of each hatch panel is thus released from the rib 31 and is brought into the position 2*a***.

While they continue to rotate, the rods 19 further drive the nuts 20 in the directions of the arrows so that both rollers 27 and 28 are displaced upwardly along the guides 29 and 30. At the end of this displacement, the arms 22 and 23 assume the positions **22*a* and 23*a*, wherein the panels 2 are in the position 2*b***. The hatch is thus completely opened to permit lowering the bomb-carrying plate or the self-propelled engine to be jettisoned.

Conversely, if the shafts 7 are rotated the opposed way, the hatch panels are brought back into obturating position.

Since both shafts 7 rotate at each instant by the same angle, so that all nuts 20 are simultaneously displaced by the same distance at both ends of the stowage-room, both hatch panels move symmetrically with respect to the longitudinal midplane of the hatch.

In the diagrammatic views of Figures 1 and 2, the plate 3 is advantageously suspended through a swivel-joint in the vicinity of its centre of gravity to the lower end of the screw-jack 5.

The following description refers to Figures 6 to 12 and gives an illustration of means for guiding the displacement of the plate 3 or the beam 9, while maintaining the same in parallel relationship with themselves.

At the ends of the plate 3 and in the vicinity of its corners (Figures 6 to 9), levers 33 are pivoted on axles 32, each of said levers carrying at its free end, on a transverse axle 34, a pair of rollers 35. The two rollers of each pair are guided in two registering hollow rails 36 rigid with the fuselage and carried, for example, on supports 37 secured to a surface 38 that constitutes the top wall of the stowage-room.

The levers 33 of each pair located at each end of the plate 3 (which in this embodiment constitutes a kind of frame) are interconnected through an axle 39 on which is journaled a tube 40. Curvated arms 41 are secured at one end to said tube 40 and pivoted at their other end around an axle 42 carried on a support 43. This constitutes a rigid assembly which is attached to the fuselage 1 for example on intermediate partitions 44 acting as cross-bracing members for the fuselage and limiting longitudinally the stowage-room.

Each axle 34 carries a nut 46 preferably of the multiple thread type, said threads being strongly inclined so as to act as a reversible threading; the two nuts 46 of each pair offer opposite-hand pitches. In these nuts are engaged the also opposite-hand threaded ends of a rod 47 rotatably, but not slidably, mounted in a bearing 49 rigid with the fuselage 1. The screws 47 located on either side of the plate carry pinions with oblique toothings 50 gearing with right-angled bevel pinions 51 keyed on a same shaft 52.

As the jack 5 begins to displace the plate 3 vertically, all rollers 35 are simultaneously displaced in the rails 36 which exert, according to the directions of the said displacement, either a pulling or a pushing stress on all nuts 46. Now the displacement of only one of said nuts suffices to determine a rotation of the corresponding threaded rod 47 and, hence, through the gears 50, 51 and 52, a rotation of both rods 47 in the same sense and by the same angle. As a result, the four nuts 46 are displaced by the same distance so that the four corners of the plate are lowered or raised by the same height.

Thus, starting from the position of Figure 6, the plate may be brought, at the end of its lowering stroke, into the position shown in Figure 9, while continuously remaining parallel to itself.

The same guiding arrangements may be adapted for actuating a beam 9 carrying a special engine 8 to ensure lowering and raising of the said beam in continuous parallel relationship with itself. However, an alternative embodiment of a guiding device more especially adapted to this case will be described hereunder.

In Figures 10 to 12, the articulated levers 10 shown in Figures 3 and 4 comprise two arms **10*a* and 10*b* the ends of which are respectively hinged on the fuselage through yokes 53 and on the beam through yokes 54. The arm 10*b* is provided with an upward extension and carries on an axle 34, a pair of rollers 35**.

As more clearly shown in Figure 12, the arm **10*b* has the general form of a lozenge, while each arm 10*a* is duplicated. Thus, there are only used two pair of rails 36** aligned with each other and extending symmetrically with respect to the mid vertical plane of the whole assembly.

To obtain a lowering of the beam in permanent parallel relationship with itself, it suffices that both axles 34 be displaced by the same length and in the same direction. This result may be obtained by means of a cable 55 forming a loop and passing over pulleys 56. This cable anchored to both axles 34 crosses itself in the mid region of the device and passes over auxiliary pulleys 57.

In these conditions, when one of the axles 34 moves by a certain distance in a given direction, the other axle is constrained to move to the same extent and in the same direction which ensures a displacement of the beam 9 in parallel relationship with itself.

In Figures 13 to 15, there is shown a device which may be used for displacing vertically either a plate 3 or a beam 9 and which permits, moreover, with one single motor, also maintaining the actuation of the drop gate at the required time. This device corresponds to the assembly 5—6 of Figures 1 to 4. It comprises a motor 58 which, through one or more reducing gears 59, drives the planet-wheel carrier 60 of a differential gear having bevel pinions. The planet-wheels 61 gear with two sun-wheels 62 and 63 having opposed bevel toothings. These sun-wheels are carried on coaxial tubular shafts **62*a*** and 63*a*, respectively. The tubular shaft **62*a* which extends inside the shaft 63*a* is rigid with a helical toothed-wheel 62*b* gearing with a tangential worm-screw 64. Similarly, the tubular shaft 63*a* carries a helical toothed-wheel 63*b* gearing with a second tangential worm-screw 65. Both worm-screws 64 and 65 are reversible; in other words, not only can they drive the helical wheels 62*b* and 63*b*, but they may be also driven from the latter. However, the tangential component of the driving torque exerts a slight axial stress on each of the shafts (64*a*, 65*a*) carrying the said worm-screws. Now, the shaft 64*a* carries at one end a friction-plate 64*b* which may be engaged on a high-friction ring 64*c* while the shaft 65*a* carries a similar friction-plate 65*b* that may be engaged on a high-friction ring 65*c***.

As well known, when the planet-wheel carrier 60 of such a differential gear is rotated, both sun-wheels 62 and 63 and, hence, both helical-wheels **62*b* and 63*b***, tend to be rotated the same way.

When, as shown in Figures 14 and 15, both sun-wheels are rotated as indicated by the arrow D, the helical wheel **62*b* displaces the worm-screw 64 towards the left, which presses the plate 64*b* against its high-friction ring 64*c* so that, in the absence of any extraneous action on the shaft 64*a*, the sun-wheel 62 becomes prevented from rotating. At the same time, the rotation D of the wheel 63*b* pushes towards the left the shaft 65*a*, which takes the plate 65*b* away from its high-friction ring. Thus, the sun-wheel 63 is free of rotating. Conversely, for a rotation R, it is the sun-wheel 62 which can rotate freely, while, in the absence of any extraneous action on the shaft 65*a*, the sun-wheel 63** is held stationary.

Each shaft (**64*a*—65*a*) comprises a thinner portion (64*d* and 65*d* respectively) journalled in a ball-bearing. The latter act as abutments to limit the axial displacement of the shafts 64*a* and 65*a*, as the plates 64*b* and 65*b* are taken away from their high friction-abutment. Thus, in Figure 15, where the drive has been assumed to take place as indicated by the arrows D, the shaft 65*a* abuts against the ball-bearing 65*e***.

The shaft **62*a* is provided with longitudinal splines on which is engaged a screw 66 cooperating with a nut 67. The said nut which has been diagrammatically shown in the conventional form preferably includes rolling bodies such as rollers engaged between the threads of the screw so as to reduce the friction by screwing. The plate 3 is secured through a swivel-joint 68 to the lower end of the screw 66. The said swivel-joint is carried in a ring 71 which is freely rotatable in a groove provided at the lower portion of the screw 66** so that the latter can rotate freely.

Inside the tubular shaft **62*a*, is disposed a second screw 69 for which the lower portion of the screw 66 acts as a nut. This inner screw, which is removable, is secured at its lower end to a second swivel-joint 70 provided for attaching the beam 9. The said joint is rigid with the screw 69. Since the nut driving the said screw is rotatable (screw 66) the axial displacement of the screw 69** is obtained by preventing the said screw from rotating.

The screws 66 and 69 respectively correspond to the screws **5*a* and 5*b* of Figure 4. The rotation of the sun-wheel 62 brings the screw 66 out together with the screw 69 since, due to the presence of the swivel-joint 70, this last screw cannot rotate owing to the interconnection of the beam 9 through the linkages 10** with the fuselage of the aircraft.

The tubular shaft **63*a* which carries at its lower end a bevel-toothing 72 gears with bevel-pinions 73 driving shafts 7. The mid-portion of the tubular shaft 63*a* is threaded as indicated at 74 and, on this threading, is engaged a nut 75 prevented from rotating by a longitudinal key 76. The nut 75 constitutes a kind of repeater for indicating the position of the hatch panels. For this purpose, the axial stroke of said nut is so calculated that during this stroke, the rotation of the shaft 7** ensures a complete opening or closing stroke of the hatch panels through the intermediary of the device described with reference to Figure 5. Thus, for example, when the nut is in its lowermost position (as shown in Figure 13), the hatch panels are closed while, when it is in its uppermost position, the hatch panels are open.

The device shown in Figure 13 further comprises electrical and mechanical coordinating devices so as to ensure the motion sequences required as specified with reference to Figures 1 to 4.

These coordinating devices include a lever 77 acted upon by a return spring 78 of which the end **77*a* may be displaced upwardly by a flange provided on the screw 66. Thus, the lever 77 is actuated when the screw 66 has reached its uppermost position, i.e. when the beam has reached the top of the stowage-room. This lever 77 acts, through a rod 79 and a bell-crank lever 80 carrying a push finger 191 on a shouldering of the shaft 65*a* in the suitable direction to take the plate 65*b* away from its high-friction abutment 65*c* (cf. Figure 15). Above the lever 77 is disposed a second lever 81 of which the end 81*a* is actuated by a flange 82 of the screw 66 when the same has been completely lowered (cf. Figure 18). A rod 83 provided with a fork connects lever 81 with a tilting member 84** of an electric reversing switch so as to control the latter in a manner which will be described hereunder with reference to Figure 13*a*.

Above the lever 81 is disposed a third lever 85 of which the end **85*a* is actuated when the nut 75 is in its lowermost position. Through a fork linkage 86, the lever 85 also acts on the tilting member of the reversing switch 84 and through a linkage 87 it further acts on the tilting member 88** of a second reversing switch to be also described with reference to Figure 13*a*. Finally, the lever 85 further acts, as also described with reference to this figure, on a pair of contacts.

Above the lever 85 are pivoted around a common axle 90 two levers 89 and 189 slightly shifted with respect to each other so that the lever 189 be first engaged as the nut 75 is raised. Thus, these two levers are successively tilted as the nut 75 reaches its uppermost position. The lever 89 is interconnected through a rod 91 with a bell-crank lever 92 which, through a ball-thrust bearing 93 may act on the shaft **64*a* to take the plate 64*b* from the high-friction abutment 64*c* (cf. Figure 14). The lever 189 carries a hook 190 which is pressed upon by a leaf-spring 192 and which may engage the push finger 191 to release the same from the shouldering of the shaft 65*a***.

Further to the levers 89 and 189, the axle 90 also carries a crank-arm 94 at the end of which is pivoted a dog 95 cooperating with a stud 96 carried by the lever 89. A srping 97 urges the said dog towards the said stud. On the common pivot 98 of the dog and crank-arm is further hinged a rod 99 leading to a sixth lever 100 located in the upper portion of the device. The end of the lever 89 to which is secured the rod 91 carries a cranked floating lever 101 interconnected through a short rod 102 with the tilting member 88.

Finally, at the upper end of the device is secured in the vicinity of the lever 100 a seventh lever 103 which, through a linkage 104, is connected with a bell-crank lever 105 which may act, through a ball thrust-bearing 106, on the shaft **65*b* to take the plate 65*b* away from its high-friction abutment 65*c*, i.e. in the same direction as the push finger 191. The bell-crank lever 105 is provided with an extent 105*a*, the end finger 105*b* of which may act on the floating crank lever 101. Moreover, on the bell-crank lever 105 is hinged a fork rod 107 acting on dog 95 in opposition with spring 97**.

The end of the lever 103 is engaged in an opening of a sleeve 108 slidably mounted at the top of the device. The said sleeve 108 is connected with a telescopic rod 109 extending along the axis of the device and the lower end **109*a* of which is adapted to come into contact with the partially obturated upper end 69a of the screw 69. Thus, at the end of the lowering stroke, since the rod 109 is completely elongated, it drives the sleeve 108 downwardly, which causes tilting of the lever 103. Conversely, the upward displacement of said sleeve is ensured by the return spring 110 of the lever 103**.

The lower end of the sleeve 108 is provided with dog-clutch teeth 111. The said dog-teeth are adapted to co-operate for dog-clutching purposes with registering dog-teeth 112a of another sleeve 112 keyed on the tubular shaft 62a. The sleeve 112 is subjected to the action of a return-spring 113 in such a manner that, in spite of the dog-clutching action between the teeth 111 and 112a, the shaft 62a is permitted to rotate in a direction corresponding to the displacement of the screw in the downward direction. However, even when the sleeve 108 is in its lowermost position, due to the presence of the lever 100, it is possible to release the dog-teeth 112a from the dog-teeth 111 by displacing the sleeve 112 against the action of the spring 113.

In order to take into account possible small defects of alignment between the mechanism and the attachment-joint of the plate or the beam, the said mechanism is suspended in the stowage-room through a swivel-joint 114.

Figure 13*a* shows a wiring diagram for the above described device.

58 is an electric motor of the comopund type, i.e. comprising for energizing its rotor 115 a shunt-winding 116 and a series-winding 117. As well known, the rotation of such a motor may be reversed by means of a two-way switch capable of inverting the polarity of the current through the rotor while leaving unchanged the polarity of the current through the two stators or vice-versa. Such a motor which may be, for example, fed from one pole 118 of a suitable current source comprises conventionally for the reversal of its rotation four terminals *a*1 . . . *a*4 to be interconnected with such a two-way switch.

Now, by means of a four-way switch 119 diagrammatically shown in the drawing in dot-dash-line, the four terminals *a*1 . . . *a*4 may be interconnected, when the movable member of the said switch 119 is displaced as shown at B with four other terminals *b*1 . . . *b*4, and when the said member is displaced as shown at E with four terminals *e*1 . . . *e*4.

Through a four-wire cable 120, the four terminals *b*1 . . . *b*4 are interconnected, in turn, with four terminals *b'*1 . . . *b'*4 of a first rotation reversing device $I_B$ actuated by the tilting member 84. The reversing device $I_B$ comprises two movable contacts 121 and 122 for reversal and, moreover, a third movable contact arm 123, the function of which will be described hereunder.

In the position shown in full line of the contact arms 121, 122 and 123, the planet-wheel carrier rotates as indicated by the arrow D. Conversely, for the opposed position of the said contact arms, the said planet-wheel carrier would rotate as shown at R.

Similarly, a four-wire cable 124 connects the four terminals *e*1 . . . *e*4 to the four terminals *e'*1 . . . *e'*4 of a second reversing device $I_E$ only comprising the two contact arms 125 and 126 required for reversal. As previously, in the full line position of the contact arms 125 and 126 the motor rotates as indicated by the arrow D, while in the opposed position of said contact arms, it rotates as shown at R. The reversing device $I_E$ is actuated by the tilting member 88. The reversing device $I_B$ is associated with the control of the plate 3 (bombs) and the reversing device $I_E$ is associated with the beam 9 (special engine).

The operation of the reversing switch 119 which selectively branches one of the reversing devices $I_B$ and $I_E$ may depend on whether the plate 3 or the beam 9 is mounted on the device so that the corresponding reversing device ($I_E$ or $I_B$) be automatically switched in while the other one remains unoperative.

The energizing circuit of the motor 58 after having passed through the reversing switch 119 is closed on the other pole of the current source through a handle 127 located in the cockpit to be actuated by the pilot. The said handle may be brought into contact either with fixed contacts O or with fixed contacts F; in its mid neutral position, the said handle interrupts all feeding circuits. Two conductors 128 and 129 lead from the lower fixed contacts O and F of the said handle to the fixed contacts associated with the movable contact arm 123 of the reversing device $I_B$. The two conductors 128 and 129 associated, on the one hand, with the handle 127 and, on the other hand, with the movable contact arm 123 constitute a conventional two-way wiring system for completing the circuit of the motor 58 passing through the reversing device $I_B$.

Similarly, the two upper fixed contacts F and O of the handle 127 are interconnected through conductors 130 and 131 to the reversing device $I_E$ for completing the circuit of the motor passing through the said reversing device. However, the conductor 130 comprises two parallel derivations 130a and 130b respectively passing through contacts $C_3$ and $C_2$. The contact $C_3$ is associated with the lever 81 and the contact $C_2$ with the lever 85. Similarly the conductor 131 has two derivations 131a and 131b passing through contacts $C_4$ and $C_1$, respectively. In the same manner, as the contact $C_2$ and in the same direction as the latter, the contact $C_1$ is associated with the lever 85 and the contact $C_4$ with the lever 103.

It is to be noted that the lever 85 opens both contacts $C_1$ and $C_2$ when the nut 75 is in its lowermost position, i.e. when the drop-gate is closed. Since the final positions, in the case when the support is constituted by the beam 9, always correspond to the closed configuration of the drop-gate, the lever 85 then interrupts on one derivation of the conductors 130 and 131 the energizing of the motor. It will be seen that the contacts $C_3$ and $C_4$ oriented in the opposed direction act in the same manner when the beam 9 is used as the reversing contact arm 123 in the case when the support is constituted by the plate 3 to obtain a two-way wiring system between the conductors 130 and 131 through the handle 127.

This device operates as follows:

At rest, in both cases when the support is constituted by the plate 3 or by the beam 9, the said support assumes the position shown in Figures 1 and 3; in other words, it is enclosed within the stowage-room and the drop-gate is closed. The device shown in Figures 13, 13*a*, 14 and 15 is then in the configuration shown in these figures.

Whichever may be the position of the reversing switch 119 (Figure 13*a*), when the handle 127 is brought on the fixed contacts O, the motor 58 is started and the planet-wheel carrier begins to rotate as shown at D. The current flows, according to the position of the reversing switch 119, either through the conductor 128 into the reversing device $I_B$ due to the position of the contact arm 123 at this moment, or through the derivation 130a and the conductor 130 into the reversing device $I_E$ since the contact $C_3$ is then closed.

As the motor 58 is started, the sun-wheel 62 is prevented from rotating (Figure 14): any angular displacement of the said sun-wheel due either to the motor or to the weight of the plate 3 tends as a matter of fact to press the plate 64b stronger on its high-friction abutment, which completely locks the said sun-wheel. The other sun-wheel 63 is driven which causes a rotation of the shafts 7 (opening of the gate panels) and an upward displacement of the nut 75 along the threading 74.

At the very beginning of the opening stroke of the drop-gate panels with simultaneous rising of the nut 75, the lever 85 is released (Figure 17) which in the case when the support is a beam 9 determines the closing of the contacts $C_1$ and $C_2$ thus maintaining the motor 58 energized as long as the drop-gate remains open.

Towards the end of the ascending stroke of the nut 75, the latter first meets the lever 189 and since the hook 190 engages the push finger 191, the same is taken away from the shouldering of the shaft 65a (Figure 16). The latter then becomes capable of being displaced towards the right to bring the plate 65c on its high-friction abutment.

The nut 75 then tilts the lever 89 which, through the rod 91 and the bell-crank lever 92 releases the plate 64b from the high-friction abutment 64c. In other words, the nut 75, when reaching the upper end of its stroke shifts the transmission of the torque from the sun-wheel 63 to the sun-wheel 62. The sun-wheel 63 which initially was the only one capable of rotating is stopped as the drop-gate panels come into abutment at the end of their opening stroke. However, it is essential that the said panels be not capable of reclosing under their own weight. Due to the withdrawal of the push finger 191 before the release of the sun-wheel 62 (by the lever 92) any unwanted reclosing of the panels is prevented from happening. This is due to the fact that such reclosing would cause a counter-rotation of the screw 63a which would result in bringing the plate 65b against its high-friction abutment 65c, which would be possible owing to the withdrawal of the finger 191.

This illustrates why it is essential that the shaft 65a be released before the shaft 64a is positively acted upon to release the sun-wheel 62.

Since the sun-wheel 63 cannot go on to rotate in the initial sense (due to the fact that the hatch panels have reached their end-of-stroke abutments) nor in the opposed direction (due to the contact of the plate 65b with its high-friction abutment) the sun-wheel 62 is now free of rotating, which triggers the lowering stroke of the screw 66 and hence that of the plate 3 or the beam 9. As soon as this lowering motion has begun (cf. Figure 17) the lever 77 is tilted under the action of the spring 78 and the bell-crank lever 80 then pivoted anti-clockwise releases the push-finger 191 from the hook 190. The said push-finger is thus brought back into contact with the shaft 65a, whereafter it will be capable of acting on the same only if the bell-crank lever 80 is tilted the opposed way.

We will first assume that the reversing switch 119 is set in its left-hand position: this corresponds to the case when the plate 3 is used, the inner screw 69 being removed.

Since the sun-wheel 62 can rotate freely, the outer screw 66 is driven by the splints of the shaft 62a and the plate 3 is lowered. This lowering motion goes on until the shouldering 82 meets the lever 81 to tilt the same which, through the fork rod 83, shifts the tilting member 84 of the reversing device $I_B$ into its opposed position.

The feeding circuit of the motor is interrupted by the switching of the movable contact arm 123, so that the device is stopped in the configuration "drop-gate open; support outside." Moreover, the switching of the movable contact arms 121 and 122 has then prepared the reversal of the rotation of the motor so that, when the handle will be brought on the fixed contact F, the two final steps of the operation including the retraction of the plate 3 and the reclosing of the drop-gate will take place.

When a beam 9 is used (with the inner screw 69) the operation of the device is slightly different.

In this case, at the end of the opening stroke of the hatch panels (cf. Figure 17) the tilting of the lever 89 which has caused an axial displacement of the shaft 64a has, in the same time, tilted the cranked lever 101 rearwards, thus bringing the upper end of the said lever into contact with the finger 105b. However, the position of the tilting member 88 of the reversing device $I_E$ has remained unchanged. Since the motor 58 is fed through the said reversing device, the shaft 62a rotates as indicated at D and the assembly comprising both screws 66 and 69 is lowered. Therefore, the telescopic rod 109 is elongated.

When the swivel-joint 70 carrying the beam 9 comes in the vicinity of its lowermost position, a pulling stress is exerted through the rod 109 on the sliding sleeve 108 against the action of the spring 110. As a result, the dog-teeth 111 engage the dog-teeth 112a so that the end of the lowering stroke of the beam 9 determines dog-clutching between both parts 108 and 112. This dog-clutching permits lowering but the dog-teeth are so oriented that any unwanted counter-motion of the beam 9 is made impossible.

Since the lever 103 driven by the sleeve 108 has been tilted, the contact $C_4$ is now closed and the bell-crank lever 105 has been tilted through the rod 104. This results in two effects: on the one hand, the cranked lever 101 has actuated the reversing device $I_E$ through the tilting member 88 and, on the other hand, the shaft 65 has been pushed back towards the left, thus releasing the plate 65b from its high-friction abutment 65c (cf. Figure 18). The contacts $C_1$ and $C_2$ are still closed since, at this moment, the drop-gate is open.

Consequently, since the contact $C_3$ has been already opened at the end of the lowering stroke of the screw 66 and since the handle 127 is still set on the fixed contact O, the motor 58 continues to be fed through the contact $C_2$, but this time, it rotates in the opposed direction, as shown at R.

Now, for this way of rotation of the motor (cf. Figures 14 and 15), it is normally the sun-wheel 62 which should rotate, while the sun-wheel 63 ought to be locked; however, owing to the dog-clutching 111—112a, the sun-wheel 62 is held stationary, while, due to the action of the bell-crank lever 105, the plate 65b is held away from its high-friction abutment, so that the sun-wheel 63 is free of rotating in the direction R, which drives the shafts 7 the suitable way to close the drop-gate.

In these conditions (cf. Figure 19), the nut 75 is lowered while the drop-gate is reclosed. The levers 89 and 189, under the action of their return springs (132 and 193) reassume the position they had in Figure 13. Due to the tilting of the lever 103, the fork 107 has released the stud 95b so that the dog 95 is also released and so that under the pushing action of the spring 97, the dog 95a can be hooked on the stud 96, which establishes an interconnection between the lever 89 and the crank arm 94, which will subsequently permit, as described hereunder, an action of the lever 89 on the rod 99 and another action of the lever 100 on the upper dog-clutching of the device (cf. Figure 19). Now, the hook 190 has been returned into registering with the pushing-rod 191, but since the beam 9 is now in its lowermost position, the bell-crank lever 80 holds the said pushing-rod away so that it cannot engage the hook 190.

Towards the end of the closing stroke of the hatch panels (Figure 19), the nut 75 meets the lever 85 and, since the fork 87 owing to the position of the tilting member 88 abuts on the end of the said lever, the tilting of the same ensured both opening of the two contacts $C_1$ and $C_2$ and switching of the reversing device $I_E$. Since both contacts $C_2$ and $C_3$ are thus open, the motor 58 is no more fed, but its rotation the opposite way, i.e. as shown at D, is prepared. Thus, finally, the beam 9 has been brought out into its lowermost position, the hatch panels are completely reclosed and since the feeding circuit is now cut-off, the device remains in this configuration as long as required for jettisoning the engine suspended under the beam 9.

To reset the device into its initial configuration, it suffices to switch the handle 127 from the fixed contacts O to the fixed contacts F.

We will first consider the case of the plate 3. Originally, the device assumes its configuration "drop-gate open; plate 3 outside" (Figure 17) and the reversing device $I_B$ controlled by the levers 81 and 85 acting on the tilting member 84 is set in the position corresponding to the rotation R of the motor 58. Since the handle 127 has been brought on the fixed contacts F, the two-way wiring system is closed through the corresponding conductor, the motor rotates in the direction R and, as shown in Figures 14 and 15, the sun-wheel 62 rotates freely while the sun-wheel 63 is locked. Consequently, the screw 66 is withdrawn in its housing; it releases the lever 81 and hence, through the fork 83, the tilting member 84 to be actuated subsequently.

At the end of the retracting stroke of the plate, the lever 77 is tilted against the action of its spring 78 upon the return of the screw 66 into the position shown in Figure 13. During this motion of the lever 77, the rod 79 acts on the bell-crank lever 80 and, hence, on the push-finger 191 thus displacing the shaft 65*a* towards the left which releases the sun-wheel 63. In the same time, the push-finger 191 is engaged again under the hook 190.

It is to be noted that once the plate 3 has been retracted, it cannot slide downwardly again under the action of its own weight, since this would bring the plate 64*b* into contact with its high-friction abutment 64*c*. Since the screw 66 is now completely retracted in its housing, no further rotation of the said screw is possible, so that the sun-wheel 62 is stopped. Since the sun-wheel 63 is now free of rotating, it begins to be driven in the direction R, which causes reclosing of the drop-gate and, hence, lowering of the nut 75. At the end of the lowering stroke of the said nut, the action of the same on the lever 85, transmitted to the rod 86, shifts the tilting member 84 which, through the movable contact arm 123 interrupts the previous feeding circuit of the motor while preparing the rotation of the same in the opposed direction, in view of a new lowering of the plate. Since the device has reassumed the configuration of the Figure 13, such a new lowering will be easily obtained by bringing the handle 127 on the fixed contacts O.

In the case when the support is constituted by a special engine suspended to a beam 9, it is the conductor 131 of the two-way wiring system 130—131 which intervenes to energize the motor 58 through the contact $C_4$ then closed and the reversing device $I_E$. The tilting member of the latter is then in its upper position shown in Figure 19 which is similar to its original position. Thus, the motor is started in direction D.

The conditions of rotation of the sun-wheels 62 and 63 are similar to those of Figure 13 except that it is now the bell-crank lever 105 (Figure 20) and no more the push finger 191 which holds the plate 65*b* away from its high-friction abutment. Thus, the planet-wheel 63 rotates in the direction D and the drop-gate is opened as in the case of the first operation described.

Figure 21:
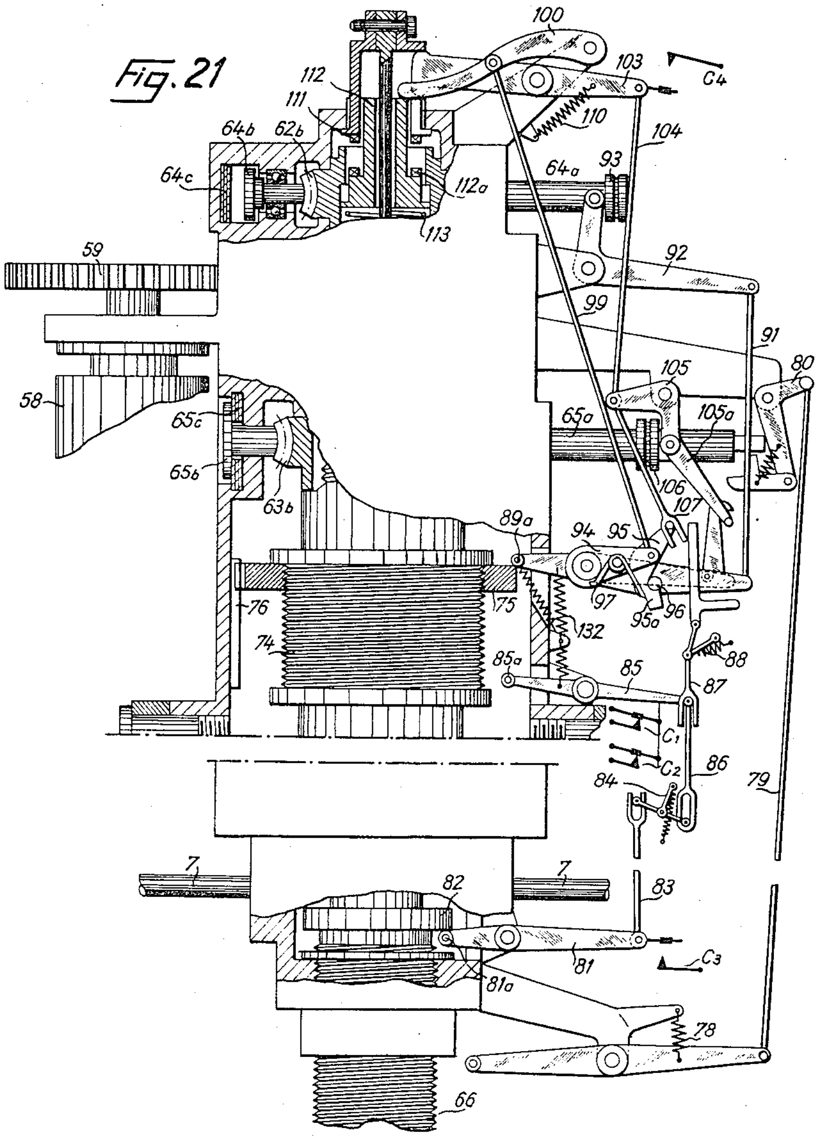

During this motion (Figure 21), the nut 75 is raised and as soon as the lever 85 is released, it closes the contacts $C_1$ and $C_2$ and no more prevents, through the fork 87, switching of the tilting member 88. As the nut 75 has reached its uppermost position, it acts on the levers 89 and 189 and tilts the same clockwise. As shown in Figure 21, the tilting of the lever 189 has no effect this time since the hook 190 does not engage the finger 191, but the tilting of the lever 89 has the following results:

(*a*) The shaft 64 is displaced towards the right by the lever 92, which releases tse sun-wheel 62;

(*b*) Since the finger 105*b* is held in contact with the cranked lever 101 due to tilting of the lever 103 the lowering of the pivot 133 of the lever 101 causes switching of the tilting member 88;

(*c*) Finally, since the crank arm 94 is, at this moment, owing to the presence of the stud 96, connected to the lever 89, through the rod 99, the sleeve 112 is lowered against the action of the spring 113, which also releases the pinion 62 so that the same can now rotate to bring the screw 66 upwardly again.

Since the motor then rotates in direction R (reversal of $I_E$), the sun-wheel 62 is free of rotating and brings both screws 66 and 69 upwardly again. As it is shortened again, the rod 109 no more exerts any pulling stress on the lever 103 (Figure 21) and the same is then free of being actuated by the spring 110, which takes the bell-crank lever 105 away from the ball-thrust bearing 106, thus releasing the shaft 65*a*.

Any unwanted reclosing of the hatch panels, which would result in a rotation of the sun-wheel 63 in the direction R, is impossible (see Figure 15) since this would bring the plate 65*b* into contact with its high friction abutment 65*c*. On the other hand, as previously, any further opening of the hatch panels (rotation of 63 in direction D) is also impossible, since the said panels are now abutted in their uppermost position.

During this motion, the fork-rod 107 has come into contact with the stud 95*b* of the dog 95 again, but the stud 96 cannot be unhooked yet since the lever 89 is tilted, due to the fact that the nut 75 is in its uppermost position (drop-gate open).

When both screws are completely retracted, as in the case when the support is a plate, the lever 77 is tilted which, through the bell-crank lever 80 and the push finger 191 releases the sun-wheel 63 to permit reclosing of the hatch panels (lowering of the nut 75). Since the motor continues to rotate in direction R, the said reclosing immediately begins which, on the one hand, by returning the lever 89 into its original position, causes unhooking of the dog 95 against the action of the spring 97 and, on the other hand, due to the return of the lever 189 into its original position, engages once more the hook 190 of the finger 191.

At the end of this motion, the nut 75 which has reassumed its lowermost position (drop-gate closed) acts on the lever 85 which finally opens both contacts $C_1$ and $C_2$ while switching, through the fork-rod 87, the tilting member 88 which is thus brought from the position shown in Figure 21 to that of Figure 13.

Since the motion of the lever 103 has meanwhile opened the contact $C_4$, no current further flows through the conductor 131, so that the feeding of the motor ceases as soon as the contacts $C_1$ and $C_2$ are open. Thus, the device has been stopped once more in the configuration "beam retracted-drop-gate closed." Since the contact $C_3$ has been meanwhile reclosed, the device is ready to be actuated anew, if the handle 127 is brought on the fixed contacts O again.

Thus, it may be seen that the final configuration corresponds to the original one shown in Figure 13.

It is also possible to equip the device shown in Figures 13 to 15 with two separate motors, viz: one for controlling the screw 66 and another one for actuating the drop-gate. In this case, the coordination between the two motors is essentially electric.

The Figure 22 shows a wiring diagram for such coordination purposes.

In this diagram, a first motor $58_V$ is used for controlling the screw 66, i.e. for actuating the plate 3 or the beam 9, while a second motor $58_T$ is provided for opening and closing the drop-gate. Each one of said motors is designed in the same manner as the motor 58 of the Figure 13*a*; it is of the compound type and reversible under the action of reversing devices, respectively $I_V$ and $I_T$. The said reversing devices, in addition to their movable contact arms, provided for reversal proper, also comprise additional movable contact arms for coordination purposes.

The reversing device $I_T$ is, as previously, controlled by the motion of the nut 75 which, as in the embodiment of Figure 13, acts on two levers 85 and 89 at both ends of its stroke. The ends of said levers are engaged within the forks of two rods 135*a* and 135*b* pivoted on a bell-crank lever 136, actuating the tilting member 137 of the reversing device $I_T$.

The tilting member 138 of the reversing device $I_V$ is actuated by another bell-crank lever 139 on which are pivoted two bars 140*a* and 140*b* the ends of which are provided with elongated openings. In one of said openings is engaged one end of the lever 77, the other end 77*a* of which (Figure 13) is raised as the screw 66 reaches its uppermost position while the upper portion of the bar 140 is acted upon either by the lever 103 or by the lever 81, i.e. by the telescopic-rod 109 or by the flange 82 of the screw 66.

Owing to these coordinating arrangements, the reversing devices $I_T$ and $I_V$ are respectively switched at the ends of the opening and closing strokes of the drop-gate for the reversing switch $I_T$ and at the end of the lowering and retracting strokes of the screw 66 for the reversing device $I_V$.

The handle 127 may complete the circuit of the two motors through either of two conductors 141 and 142 forming a two-way wiring system. The conductor 141 is connected with the movable contact arms 143 and 144 of the reversing device $I_T$. The conductor 142 is connected to the movable contact arms 145 and 146 of the same reversing device.

Similarly, the reversing device $I_V$ comprises two movable contact arms 147 and 148 respectively connected through the conductor 149 to the motor $58_T$ and through the conductor 150 to the motor $58_V$. The reversing device $I_V$ further comprises a third movable contact arm 151 connected through the conductor 152 to the movable contact arm 147.

As previously, an auxiliary reversing switch 119 having two positions B and E is provided to permit selective use of a plate 3 or a beam 9. In the case of the plate 3 (position B), the said reversing switch is cut off. In the case of the beam 9, the said reversing switch ensures a connection (conductors drawn in dot-dash lines), on the one hand, between the fixed contact 147*b* of the reversing device $I_V$ and the fixed contact 145*b* of the reversing device $I_T$ and, on the other hand, between the fixed contacts 151B of $I_V$ and the fixed contact 144A of $I_T$. Furthermore, the fixed contacts 146*a* and 147*a* are interconnected through a conductor 153, the fixed contacts 146*b* and 148*a* through a conductor 154, the fixed contacts 148*b* and 144*b* through a conductor 155 and the fixed contacts 151*a* and 143*b* through a conductor 156.

Such a wiring permits exactly the same operations and in the same order as that described with reference to Figures 13 to 15.

It will be first assumed that the reversing switch 119 is in the position B (case when the plate 3 is used).

If the handle 127 is then brought on the fixed contact O, the motor $58_T$ is energized through 142, 146, 153 and 149. It then rotates as shown at D, which causes opening of the drop-gate. The nut 75, which was originally in the position shown in full line is brought into the position $75_1$ shown in dotted line and, as it moves upwardly again, it reverses the position of the tilting member 137. The feeding circuit of the motor $58_T$ is cut-off at contact arm 146 now set on the fixed contact 146*b* to feed the motor 58*b* through the conductor 154, the contact arm 146 and the conductor 150. Since the motor $58_V$ rotates in the direction D it brings the screw 66 out. At the end of the lowering stroke of the said screw, the position of the tilting member 138 is reversed by the lever 81 and, since the contact arms of the reversing device $I_V$ have been switched, the feeding circuit of the motor $58_V$ is cut-off. The device is then stopped in the configuration "drop-gate open; plate outside."

If the handle 127 is then brought on the fixed contact F, since both reversing devices $I_V$ and $I_T$ are then in their left hand position (rotation in direction R for both motors) the motor $58_V$ is energized through the contact arm 144, the conductor 155, the contact arm 148 and the conductor 150. The motor $58_V$ is then rotated to retract the screw 66 in its housing. At this time, the motor $58_T$ cannot rotate since the connection passing through the conductor 156 is interrupted at the movable contact arm 151.

When reassuming its uppermost position (under the action of the lever 77), the screw 66 brings the tilting member 138 towards the right, the motor $58_V$ is cut-off at the movable contact-arm 148 and the motor $58_T$ is energized through the movable contact arm 151. Finally, the nut 75 being reset into its lowermost position, the motor $58_T$ is cut-off at the movable contact-arm 143 and both reversing devices $I_V$ and $I_T$ further assume their right-hand position.

If the beam 9 is used, i.e. if the reversing switch 119 is in its position E, the dotted-line connections intervene in the operation of the device.

Starting again from the position shown in Figure 22, the opening of the drop-gate and the lowering of the screw 66 take place as previously but at the end of the lowering stroke of the said screw, i.e. when both reversing devices $I_V$ and $I_T$ are in their left-hand position (rotation R), the shifting of the movable contact-arm 147 from the right towards the left has completed again, through the contact-arm 145 and the auxiliary conductors 145*b*—147*b*, the circuit of the motor $58_T$ which then begins to rotate in the direction R to reclose the drop-gate behind the beam.

At the end of this motion, the reversing device $I_T$ is switched anew, i.e. is brought back towards the right which cuts-off, through the movable contact arm 145, the feeding circuit of the motor $58_T$. Now, at this time, the motor $58_V$ is also cut-off at the movable contact arm 148. Thus, finally, the beam 9 has been brought out and the drop-gate has been reclosed behind it. The reversing device $I_V$ is in its left-hand position while the reversing device $I_T$ is in its right-hand position.

To reset the device into its original configuration, it suffices to bring the handle 127 on the fixed contact F. Through the contact arms 144 and 151 (then on the fixed contact 151*b*), the motor $58_T$ is energized to rotate in the direction D, which causes reopening of the hatch panels. At the end of this reopening stroke, the reversing device $I_T$ is brought into its left-hand position. Through the movable contact arm 144, the conductor 155 and the movable contact arm 148 then in its left-hand, position, the motor $58_V$ is fed to rotate in the direction R. The beam is retracted into the stowage-room. At the end of this retracting stroke, the feeding circuit of the motor $58_T$ passing through the conductor 156 previously cut-off by the contact arm 151, is re-established as the said contact arm reassumes its right-hand position which causes feeding of the motor $58_T$ for rotation in the direction R. The drop-gate is closed again and at the end of this motion, the current is cut-off due to the switching of the reversing device $I_T$ from its left-hand to its right-hand position.

Similarly to the device shown in Figure 13, the diagram of Figure 22 uses levers to cause, at the end of the strokes of the hatch panels or the screw, a tilting of the reversing devices $I_V$ and $I_T$. However, when a purely electrical design is adopted, it may be interesting to replace such lever mechanisms by simple electric contacts actuating reversing relays.

An illustration of such a reversing relay is given in Figure 23.

The contacts 157 and 158 are actuated in any suitable manner at the end of the strokes of the hatch panels (opening and closing) or at the end of the stroke of the screw (lowering and retraction). Each one of the said contacts is mounted in series with a coil (respectively 159 and 160) carried by a nearly closed magnetic circuit 161. The armature 162 cooperating with the said circuit is a permanent magnet of which the North pole, for example, extends in the gap of the magnetic circuit 161.

Due to the permanent magnetisation of the armature 162, the latter is stable in both positions (even if no current flows through the coils 159 and 160) and it is shifted from one of these positions to the other one when, by energizing one of said coils, a South pole is created on that side of the gap which is opposed to the armature. Such an armature may be used directly as a tilting member for a reversing device such as $I_V$ or $I_T$. It may also comprise fixed contacts 163 which, through conductors 164 and 165, actuate relays ensuring successive switching of the reversing devices $I_V$ and $I_T$.

In a general manner, while it has been, in the above description, disclosed what is deemed to be practical and efficient embodiments of the invention, it should be well understood that it is not wished to be limited thereto as there might be changes made in the arrangement, disposition and form of the parts without departing from the principle of the present invention.

What is claimed is:

1. In an aircraft having a fuselage and a bomb bay formed therein, the combination with a pair of door panels forming a faired closure for said bomb bay, both panels being free to move between a substantially horizontal closed position and a substantially vertical open position within said bomb bay, and linkage means secured to fixed points of said fuselage and to said panels for guiding the movements of the latter between said closed and open positions, of a movable bomb carrying member disposed within said bomb bay, a nut held against axial and rotative movement above said member, a vertical screw threaded in said nut and supporting said member, said screw being rotatable relative to said member and relative to said nut, a source of electric current, an electric motor, switch means for connecting said source with said motor and reversing the direction of running thereof, a differential gear having one element driven by said motor, a second element connected with said linkage means for moving said door panels by said motor through said linkage means between said closed and open positions, and a third element drivingly connected with said screw to move said bomb carrying member vertically between a position in which it lies entirely within said bomb bay and a position in which the bomb or bombs carried by said member lie entirely outside said bomb bay, first brake means operative in response to rotary motion of said second element of the differential gear to lock said second element against rotation, second brake means operative in response to rotational movement of said third element of the differential gear to lock said third element against rotation, and control means operative in response to predetermined movements of said second element of the differential gear and of said screw to lock said first brake means and said second brake means alternately in an inoperative position thereof.

2. The combination according to claim 1, in which said first and second brake means include each a helical toothed wheel mounted to rotate with the corresponding element of said differential gear, a slidable and reversible tangential worm-screw in gearing relationship with said wheel, low-friction abutment means interposed between one end of said worm-screw and the casing of the differential gear to limit the axial displacement of said worm-screw in one direction, and high-friction abutment means interposed between the other end of said worm-screw and said casing to limit the axial displacement of said worm-screw in the opposed direction and lock said worm-screw against rotation.

References Cited in the file of this patent

UNITED STATES PATENTS

| | | |
|---|---|---|
| 2,335,090 | Swiech | Nov. 23, 1943 |
| 2,356,155 | Fogle | Aug. 22, 1944 |
| 2,585,030 | Nosker | Feb. 12, 1952 |
| 2,604,281 | Buchal et al. | July 22, 1952 |
| 2,634,656 | Wollens et al. | Apr. 14, 1953 |
| 2,807,193 | Robert et al. | Sept. 24, 1957 |

FOREIGN PATENTS

| | | |
|---|---|---|
| 730,654 | Germany | Jan. 15, 1943 |
| 691,256 | Great Britain | May 6, 1953 |
| 1,095,000 | France | Dec. 15, 1954 |